United States Patent
Niewisch et al.

Patent Number: 5,488,853
Date of Patent: Feb. 6, 1996

[54] MEASUREMENT ARRANGEMENT FOR CALIBRATING ULTRASONIC SHOCK WAVE SENSORS

[75] Inventors: Joachim Niewisch, Nürnberg; Ulrich Schätzle, Röttenbach, both of Germany

[73] Assignee: Siemens Aktiengesellschaft, München, Germany

[21] Appl. No.: 190,431

[22] Filed: Feb. 2, 1994

[30] Foreign Application Priority Data

Feb. 11, 1993 [DE] Germany .................. 43 04 139.6

[51] Int. Cl.⁶ .................................. G01L 27/00
[52] U.S. Cl. .................. 73/1 DV; 73/4 R; 73/655
[58] Field of Search .................. 73/1 DV, 4 R, 73/655, 705; 367/13; 250/227.14, 231.19

[56] References Cited

U.S. PATENT DOCUMENTS

| | | | |
|---|---|---|---|
| 2,539,418 | 1/1951 | Grogan | 73/4 R |
| 2,762,447 | 9/1956 | Cady | 367/13 |
| 3,215,135 | 11/1965 | Franke | 73/705 |
| 4,588,886 | 5/1986 | Snider | 73/705 |

FOREIGN PATENT DOCUMENTS

| | | | |
|---|---|---|---|
| 8607445 | 12/1986 | WIPO | 250/231.19 |

OTHER PUBLICATIONS

Fortschritte Der Akustik Daga '88, J. Staudenraus, W. Eisenmenger: *Optisches Sondenhydrophon*, pp. 467–470.

AMA–Seminar 28/29 Nov. 1988, Heidelberg, DE, J. Staudenraus, W. Eisenmenger, Universität, Stuttgart, DE, pp. 67–72.

*Primary Examiner*—Robert Raevis
*Attorney, Agent, or Firm*—Kenyon & Kenyon

[57] ABSTRACT

A lithotripsy measurement arrangement for calibrating ultrasonic shock wave sensors includes a generator 32 that is arranged at one end of a steepening tube 31 filled with a sound-carrying medium 3. Additionally, the arrangement includes an optical sensor head 34 which measures the measurement shock waves generated by generator 32 and steepened in steepening tube 31, and an analysis unit 10 optically connected via a fiber bundle 50 to sensor head 34. The end 5 of fiber bundle 50 is arranged in a measurement volume 4 inside sensor head 34 opposite a reflector region 22 of a film 2, to irradiate reflector region 22 with light and sense the reflected light. Film 2 is fastened to housing 13 of sensor head 34. Because of its low mass, film 2 follows the movement of the molecules of medium 3 when a measurement shock wave strikes an outer surface 20 of film 2. The corresponding excursion of film 2 is analyzed as a change in intensity of the light reflected back from reflector region 22 into fiber bundle 50.

22 Claims, 3 Drawing Sheets

MEASUREMENT ARRANGEMENT FOR CALIBRATING ULTRASONIC SHOCK WAVE SENSORS

BACKGROUND OF THE INVENTION

The present invention relates to a measurement arrangement for calibrating ultrasonic shock wave sensors. More particularly, the present invention relates to a lithotripsy measurement arrangement for calibrating ultrasonic shock wave sensors.

In lithotripsy, accurately calibrated sensors are needed to measure the ultrasonic shock waves generated by an ultrasonic shock wave generator and used to break up concretions in the human body. Preferred ultrasonic shock wave sensors are PVDF hydrophones. For calibration, these ultrasonic shock wave sensors can be arranged in a predetermined reference sound field of a piezoceramic reference sound source. Such reference sound sources are, however, limited to a maximum reference shock wave sound pressure of 1 bar. Since shock waves with a sound pressure of 1000 bars are typically used in lithotripsy, the parameters determined during calibration must be extrapolated to a range three orders of magnitude greater. This can lead to relatively large extrapolation errors.

SUMMARY OF THE INVENTION

The present invention relates to a measurement arrangement for calibrating ultrasonic shock wave sensors that is simple and robust and with which reference shock wave sound pressures of at least 100 bars can be achieved.

According to the present invention, a sound-carrying medium transmits measurement shock waves generated by a generating device. A measurement volume is filled with a gaseous substance having a lower acoustic impedance than the sound-carrying medium. A film having a first surface that is adjacent to the sound-carrying medium and a second surface that is adjacent to the measurement volume is configured to reflect light at least in a reflector region thereof. This film separates the sound-carrying medium from the measurement volume. As a result, a measurement shock wave striking the film is reflected with soft acoustic characteristics because of the discontinuity in acoustic impedance, and the film excursion is twice as great as it would be without a discontinuity in acoustic impedance. The result is higher sensitivity for the measurement arrangement.

The film of the measurement arrangement follows the excursion of the molecules in the sound-carrying medium due to the measurement shock wave. This excursion is converted, via an optical device for irradiating the reflector region of the film with light and for sensing the light reflected from the reflector region, into an intensity-modulated light signal. The corresponding sound pressure of the measurement shock wave is determined in an analysis unit associated with the optical device by analyzing the intensity-modulated light signal. This process may utilize the fact that the sound pressure is proportional to the derivative over time of the excursion of the molecules in the sound-carrying medium. Once determined, the sound pressure can then be used as a reference for the ultrasonic shock wave sensors being calibrated.

Measurements have shown that with such a measurement arrangement according to embodiments of the present invention, measurement shock waves with sound pressures of at least 100 bars (= $10^7$ Pa) can be measured. Thus, for the preferred application of the measurement arrangement in lithotripsy, the pressure ranges for calibration on the one hand, and for breaking up stones on the other hand, are only about one order of magnitude apart, and extrapolation can be advantageously performed over this correspondingly smaller range.

DETAILED DESCRIPTION

Figure 1:
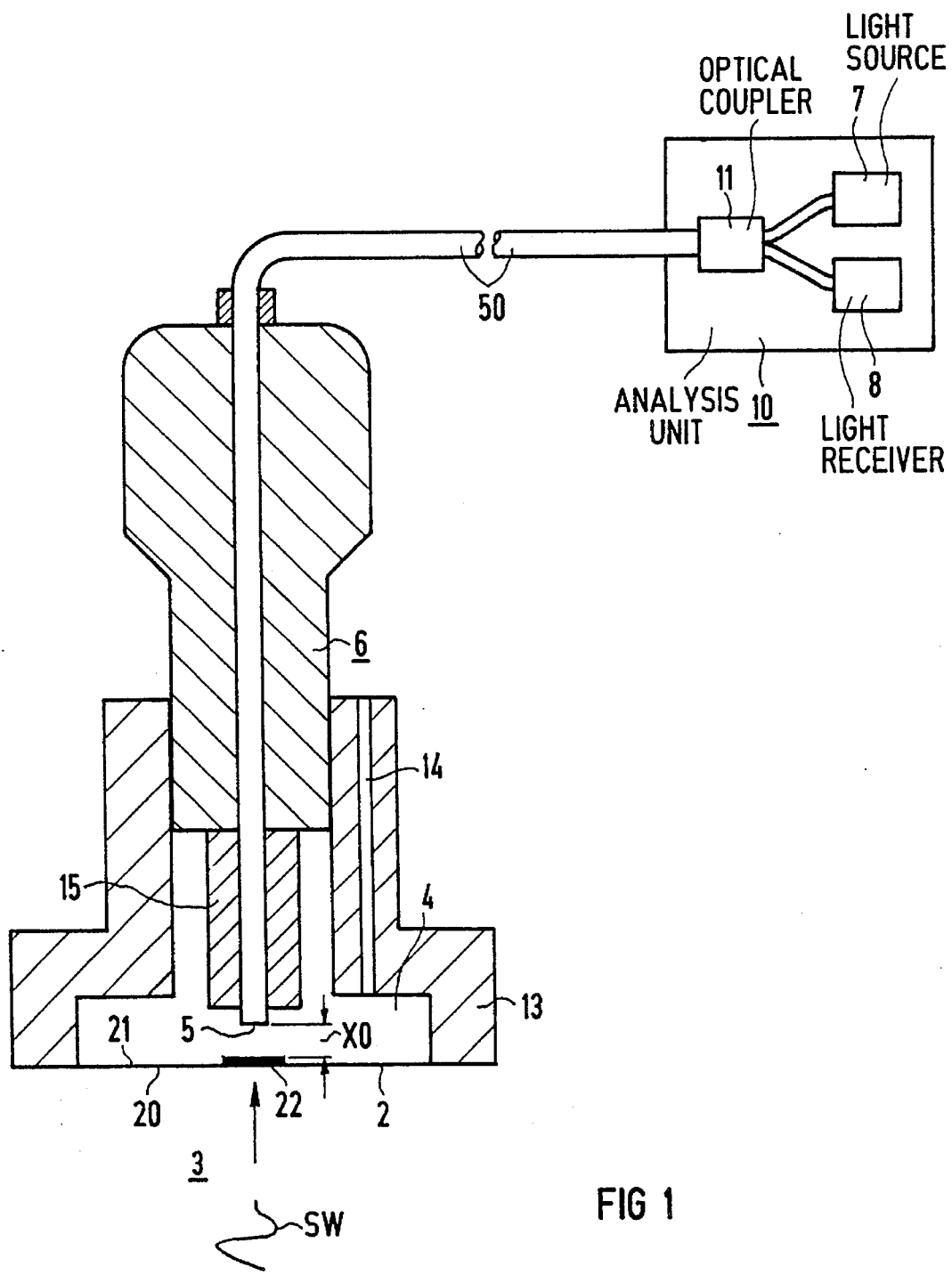
FIG. 1 illustrates a sensor head of a measurement arrangement according to an embodiment of the present invention.

In the embodiment of the present invention according to FIG. 1, a thin film 2 made of an elastic material (preferably a plastic with the trade name Mylar) is fastened, for example with adhesive, at its edge region to a housing 13.* One surface 20 of film 2 is positioned adjacent to a sound-carrying medium 3, which is generally liquid and preferably water. Housing 13 encloses a measurement volume 4, which is filled with a gaseous substance with a lower acoustic impedance than sound-carrying medium 3. The gaseous substance is preferably air. The other surface 21 of film 2 facing measurement volume 4 is configured at least partly with a light-reflecting reflector region 22. For this purpose, film 2 is preferably vacuum coated with a reflective layer, especially a reflective layer made of aluminum (Al). In this arrangement, potential decomposition of the aluminum reflective layer by medium 3, especially by water, is prevented. Alternatively, film 2 can be made of a reflective material.

*The film is then heat treated for shrinking to obtain a uniform surface tension.

An end 5 of an optical fiber bundle 50 is arranged opposite the reflector region 22 of film 2 in measurement volume 4. The end of the optical fiber bundle 50 is provided as a means 5 for irradiating at least reflector region 22 with light, and for sensing light reflected from reflector region 22. Fiber bundle 50 is fastened in a holder 15 attached to housing 13 in such a way that its end is held at a predefined working point distance X0 from reflector region 22. The center axis at the end of fiber bundle 50 is preferably aligned in a manner perpendicular to reflector region 22 to produce optimum reflection conditions.

In a particularly advantageous embodiment of the present invention, a positioning device 6 is provided for adjusting the working point distance X0 between optical means 5 and reflector region 22 of film 2. A micrometer screw is preferably provided as positioning device 6 and a vertical spindle having a through hole is provided as the holder 15 for means 5. At the same time, this arrangement including the vertical spindle contributes to equalizing the pressure between measurement volume 4 and the volume outside housing 13. A motor-driven spindle can also be provided for this function.

A hole 14 through the housing is preferably additionally provided for pressure equalization between measurement volume 4 and the outside volume. This hole 14 can, however, also be provided in positioning device 6.

In an advantageous embodiment of the present invention, means 5 is configured with a buffer device for film 2 to protect film 2 from excessive stress. The flat end 5 of fiber bundle 50 is preferably provided as the buffer device. For purposes of the present invention, the flat end 5 of fiber bundle 50 may have a suitably large cross-sectional area of generally between 5 mm² and 50 mm². In a further embodiment not shown holder 15 and means 5 are machined to the same height.*

*In this embodiment both holder 15 and means 5 are provided as the butter device and a larger cross-sectional area of the buffer device can be obtained.

Film 2, means 5, and measurement volume 4 preferably form a structural unit with housing 13. The result is a compact, robust sensor head that can easily be moved in sound-carrying medium 3. The diameter of film 2 is determined from the sound velocity and the time interval to be analyzed, and is typically between 10 mm and 50 min.

A measurement shock wave SW drawn schematically in FIG. 1 in terms of its change in amplitude over time t and generated by a generator device (not illustrated in FIG. 1), propagates in medium 3 and strikes surface 20 of film 2. The excursions of the molecules of medium 3 corresponding to the shock wave amplitude are transferred to film 2, which because of its thinness and low mass can easily be moved. The film is typically between 1 μm and 100 μm thick, and preferably between 10 μm and 50 μm thick. Because of the discontinuity in acoustic impedance between sound-carrying medium 3 and the gas in measurement volume 4, the excursion of film 2 is twice as great as the excursion of the molecules of medium 3. This must be suitably accounted for in analyzing the signal. The excursion value x(t) of film 2 and its reflector region 22 from the rest position X0 is recorded as the change in intensity in the reflected light signal, in an analysis unit 10 optically connected to fiber bundle 50. This value is analyzed as an indicator of the acoustic pressure p(t) of the measurement shock wave SW. The applicable relationship is that the acoustic pressure p(t) is proportional to the derivative over time dx/dt of the excursion value x(t). The resulting calibration parameter is either the acoustic pressure or the electrical signal of a photoconverter (not depicted in FIG. 1 but which may be implemented within a light receiver 8) included in analysis unit 10, derived from the intensity of the reflected light. This calibration parameter is then compared with a signal from the ultrasonic shock wave sensor being calibrated, measured under identical conditions at the identical measurement location with an identical measurement shock wave SW, and the signal of this sensor is adjusted accordingly.

The characteristic curve of a configuration of this kind generally has the following features: the intensity of the reflected light first rises along a leading edge, as the distance X0 from the end of fiber bundle 50 to reflector region 22 increases from zero, to a maximum, then decreases again monotonically along trailing edge. The maximum generally lies approximately between the diameter of a fiber and half the diameter of the entire fiber bundle 50. The leading and trailing edges generally have different slopes, so that different sensitivities for the measurement arrangement can be selected by choosing the working point and the measurement range on the leading or trailing edge.

The working point distance X0 is preferably placed in the trailing edge of the sensor characteristic curve. The distance X0 between film 2 and means 5 is in most cases then sufficient to prevent film 2 from striking means 5. This improves the durability of the sensor.

Analysis unit 10 includes a light source 7 and a light receiver 8 which are optically connected to fiber bundle 50, preferably via an optical coupler 11.* The intensity of light source 7 can easily be used to increase the sensitivity of the sensor. A photoconverter, for example a photodiode, followed by a transimpedance amplifier for current-voltage conversion, is preferably provided as light receiver 8.

It is understood that in an advantageous embodiment transmission fibers can be optically connected directly to the light source 7 and reception fibers directly to the light receiver 8.

The shape of the sensor's characteristic curve can be adjusted via the apportionment of transmission and reception fibers in fiber bundle 50. For example, spatial separation of the transmission and reception fibers in fiber bundle 50, for example by means of a partition, results in a flatter leading edge, while uniform statistical distribution of the fibers produces a very steep leading edge.

Figure 2:
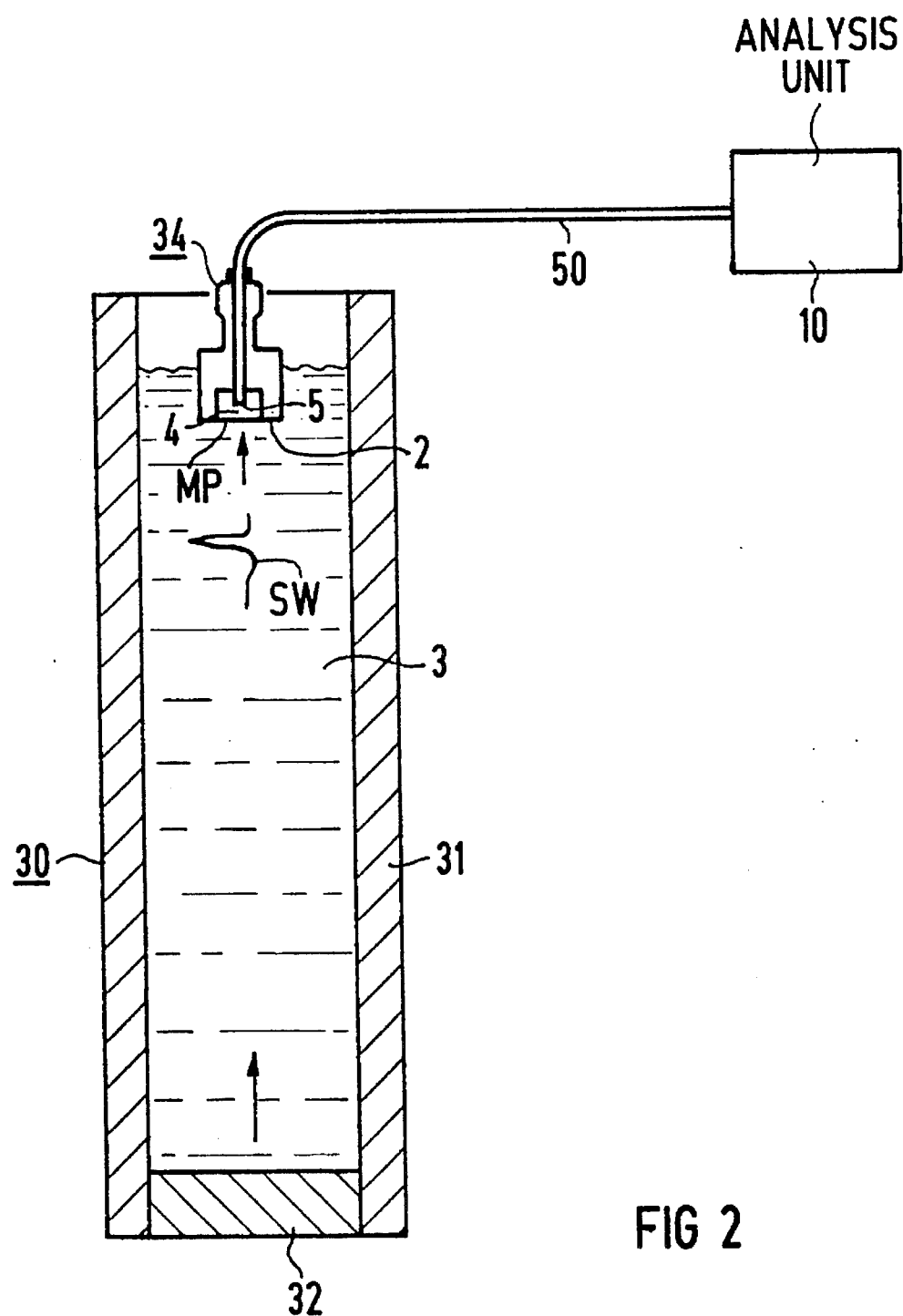
FIG. 2 illustrates an overall configuration of a measurement arrangement according to an embodiment of the present invention.

FIG. 2 illustrates a complete configuration of the calibration arrangement according to an embodiment of the present invention, schematically depicting sensor head 34 with film 2, measurement volume 4, and optical means 5. Sensor head 34 is arranged at a defined measurement position MP inside a vessel filled at least partly with water as medium 3. A generator device 30 is also provided to generate measurement shock waves and contains a generator 32 to generate flat ultrasonic waves and a steepening tube 31. Generator 32 is arranged at one end of steepening tube 31. In the embodiment of the present invention illustrated in FIG. 2 steepening tube 31 constitutes the vessel itself.

Nonlinear effects inside steepening tube 31 cause the flat ultrasonic wave from generator 32 to steepen (i.e. a measurement shock wave SW, which is again indicated schematically, forms in the steepening tube 31).

Sensor head 34 is optically connected via a fiber bundle 50 to an analysis unit 10. The result is a voltage-free connection that is also largely insensitive to electromagnetic interference fields, especially from generator 32. The length of the fiber optic cable is typically 3 to 10 m, so that the light receiver can be arranged far enough away from the interference source represented by the generator.

Figure 3:
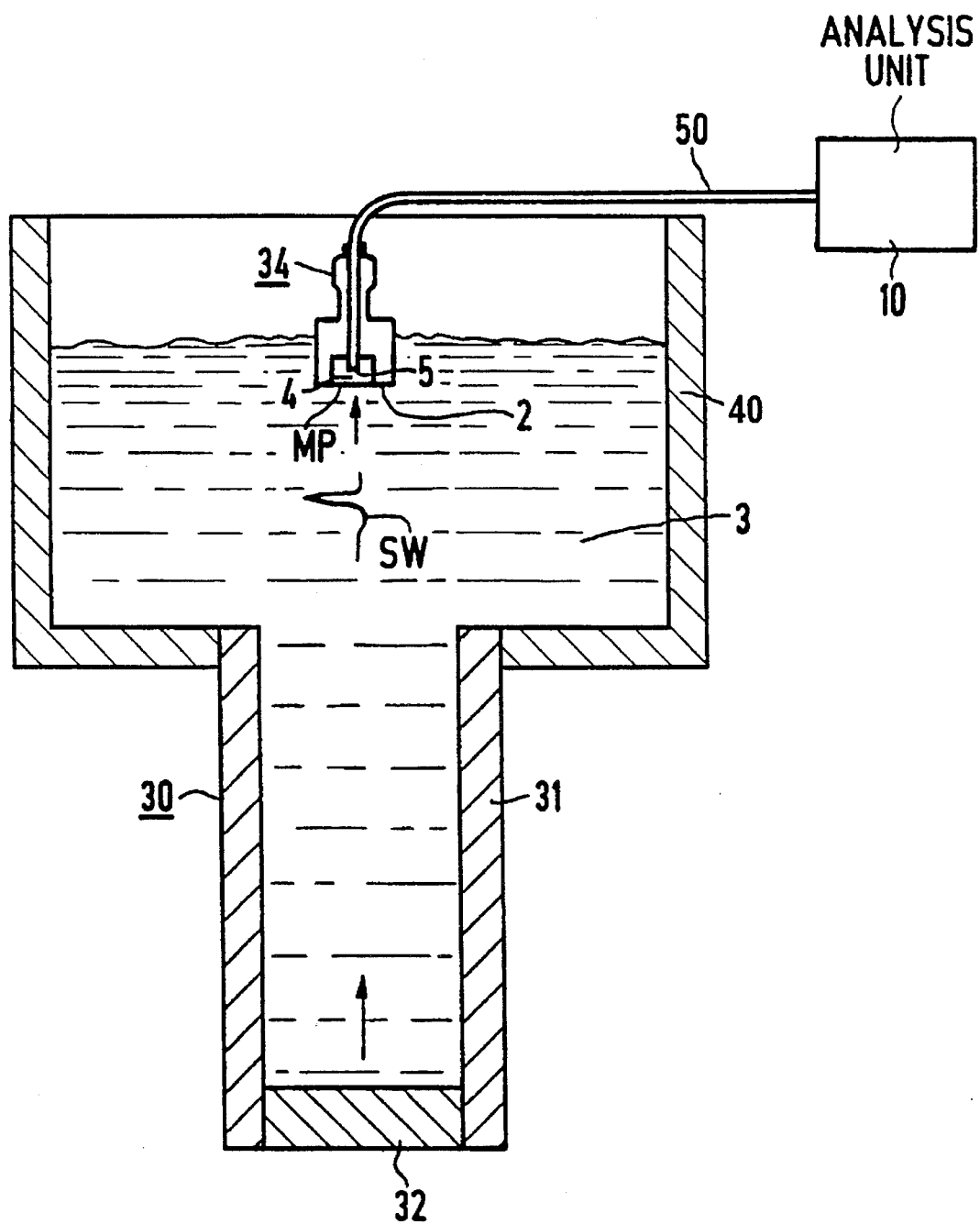
FIG. 3 illustrates another embodiment.

In another embodiment of the present invention which is not illustrated in FIG. 3, a separate vessel 40 is provided for sound-carrying medium 3. The other end of steepening tube 31 remote from generator 32 is then connected to the interior of the vessel 40 and steepening tube 31 is also filled with sound-carrying medium 3.

What is claimed is:

1. A measurement arrangement for calibrating ultrasonic shock wave sensors, comprising:

a) a generator device generating an ultrasonic measurement shock wave:

b) a sound-carrying medium transmitting said measurement shock wave generated by said generator device;

c) a measurement volume filled with a gaseous substance having a lower acoustic impedance than the sound-carrying medium;

d) a film having a first surface that is adjacent to the sound-carrying medium and a second surface that is adjacent to the measurement volume, said film having a sufficiently low thickness and low mass to follow excursions of molecules in the sound-carrying medium caused by said measurement shock wave and being configured to reflect light at least in a reflector region thereof;

e) means spaced away from the reflector region and arranged in the measurement volume for irradiating the reflector region with light and for receiving light reflected from said reflector region that is modulated in intensity by excursion of the film caused by said measurement shock wave; and f) an analysis unit in connection with said means for irradiating and receiving light, said analysis unit deriving from a change in intensity of the reflected light a reference pressure signal for an ultrasonic shock wave sensor to be calibrated, said reference pressure signal being proportional to a time derivative of the excursion of the film and corresponding to an acoustic pressure of said measurement shock wave.

2. A measurement arrangement according to claim 1, further comprising a positioning device for setting a working point of the measurement arrangement by changing a distance between the film and the means for irradiating and receiving light.

3. A measurement arrangement according to claim 2, wherein the analysis unit includes a light source and a light receiver and wherein the means for irradiating and receiving light comprises an end of an optical fiber bundle, said fiber bundle being optically connected to the light source and the light receiver of the analysis unit.

4. A measurement arrangement according to claim 2, further comprising a vessel for the sound-carrying medium, wherein the generator device comprises a generator for generating at least approximately unfocused ultrasonic waves and a steepening tube, and steepening tube being connected at one end to the interior of the vessel, and the generator being arranged at the other end of the steepening tube.

5. A measurement arrangement according to claim 1, wherein said means for irradiating and receiving light comprises a buffer device for the film.

6. A measurement arrangement according to claim 1, wherein the film is between 1 μm and 100 μm thick.

7. A measurement arrangement according to claim 1, wherein the analysis unit includes a light source and a light receiver and wherein the means for irradiating and receiving light comprises an end of an optical fiber bundle, said fiber bundle being optically connected to the light source and the light receiver of the analysis unit.

8. A measurement arrangement according to claim 7, wherein a center axis of the fiber bundle is aligned in a region of its end at least approximately perpendicular to the reflector region of the film.

9. A measurement arrangement according to claim 8, wherein the fiber bundle is divided into transmission fibers and reception fibers, and the sensitivity of the measurement arrangement is adjustable via a spatial allocation of said transmission and reception fibers in the fiber bundle.

10. A measurement arrangement according to claim 9, wherein the transmission fibers and reception fibers of the fiber bundle are spatially separated from one another.

11. A measurement arrangement according to claim 9, wherein the transmission fibers and reception fibers of the fiber bundle are uniformly statistically distributed.

12. A measurement arrangement according to claim 7, wherein the fiber bundle is divided into transmission fibers and reception fibers, and the sensitivity of the measurement arrangement is adjustable via a spatial allocation of said transmission and reception fibers in the fiber bundle.

13. A measurement arrangement according to claim 12, wherein the transmission fibers and reception fibers of the fiber bundle are spatially separated from one another.

14. A measurement arrangement according to claim 12, wherein the transmission fibers and reception fibers of the fiber bundle are uniformly statistically distributed.

15. A measurement arrangement according to claim 1, further comprising a vessel for the sound-carrying medium, wherein the generator device comprises a generator for generating at least approximately unfocused ultrasonic waves and a steepening tube, said steepening tube being connected at one end to the interior of the vessel, and the generator being arranged at the other end of the steepening tube.

16. A measurement arrangement according to claim 1, further comprising a vessel for the sound-carrying medium wherein the vessel is formed by a steepening tube, and wherein said generator device is arranged at one end of the steepening tube.

17. A measurement arrangement according to claim 1, wherein said measurement arrangement comprises a measurement arrangement for calibrating ultrasonic shock wave sensors for lithotripsy.

18. A measurement arrangement according to claim 17, further comprising a positioning device for setting a working point of the measurement arrangement by changing a distance between the film and the means for irradiating and receiving light.

19. A measurement arrangement according to claim 17, wherein the analysis unit includes a light source and a light receiver and wherein the means for irradiating and receiving light comprises an end of an optical fiber bundle, said fiber bundle being optically connected to the light source and the light receiver of the analysis unit.

20. A measurement arrangement according to claim 17, wherein a center axis of the fiber bundle is aligned in a region of its end at least approximately perpendicular to the reflector region of the film.

21. A measurement arrangement according to claim 17, wherein the fiber bundle is divided into transmission fibers and reception fibers, and the sensitivity of the measurement arrangement is adjustable via a spatial allocation of said transmission and reception fibers in the fiber bundle.

22. A measurement arrangement according to claim 17, further comprising a vessel for the sound-carrying medium, wherein the generator device comprises a generator for generating at least approximately unfocused ultrasonic waves and a steepening tube, said steepening tube being connected at one end to the interior of the vessel, and the generator being arranged at the other end of the steepening tube.

* * * * *